(12) United States Patent
Yu et al.

(10) Patent No.: US 9,442,609 B2
(45) Date of Patent: Sep. 13, 2016

(54) SENSING METHOD AND CIRCUIT FOR USE WITH CAPACITIVE SENSING DEVICES

(75) Inventors: Jie Yu, Shanghai (CN); James Zhang, Shanghai (CN)

(73) Assignee: STMicroelectronics (CHINA) Investment Co., Shanghai (CN)

(*) Notice: Subject to any disclaimer, the term of this patent is extended or adjusted under 35 U.S.C. 154(b) by 1063 days.

(21) Appl. No.: 13/588,612

(22) Filed: Aug. 17, 2012

(65) Prior Publication Data

US 2013/0043890 A1    Feb. 21, 2013

(30) Foreign Application Priority Data

Aug. 19, 2011    (CN) .......................... 2011 1 0243049

(51) Int. Cl.
| | | |
|---|---|---|
| G01R 27/26 | (2006.01) | |
| G06F 3/044 | (2006.01) | |
| G06F 3/041 | (2006.01) | |

(52) U.S. Cl.
CPC ............ G06F 3/044 (2013.01); G06F 3/0416 (2013.01)

(58) Field of Classification Search
CPC ................... G01R 19/2513; G01R 31/31723; G01R 15/142
USPC ......... 324/648, 600, 658, 660–690; 327/514, 327/60, 307; 345/147
See application file for complete search history.

(56) References Cited

U.S. PATENT DOCUMENTS

| | | | |
|---|---|---|---|
| 7,804,307 B1* | 9/2010 | Bokma ............. | G01R 27/2605 324/607 |
| 8,502,774 B2 | 8/2013 | Yamamoto et al. | |
| 2003/0035499 A1* | 2/2003 | Staszewski ............ | H03D 7/125 375/346 |
| 2009/0046827 A1* | 2/2009 | Tasher ................. | G01D 5/2405 377/19 |
| 2011/0007028 A1 | 1/2011 | Curtis et al. | |
| 2011/0210941 A1* | 9/2011 | Reynolds .............. | G06F 3/0418 345/174 |
| 2012/0162132 A1 | 6/2012 | Chen | |

FOREIGN PATENT DOCUMENTS

| | | |
|---|---|---|
| CN | 1770084 | 5/2006 |
| CN | 101387772 | 3/2009 |
| CN | 101779183 | 7/2010 |
| CN | 201600668 | 10/2010 |
| CN | 102033638 | 4/2011 |
| CN | 102033668 | 4/2011 |
| CN | 202257532 | 5/2012 |

* cited by examiner

*Primary Examiner* — Melissa Koval
*Assistant Examiner* — Trung Nguyen
(74) *Attorney, Agent, or Firm* — Slater Matsil, LLP (57) ABSTRACT

A sensing method is used for a capacitive sensing device, wherein the capacitive sensing device has a plurality of capacitive sensing components, each of which is charged or discharged by a charging component respectively. The sensing method comprises the steps of: a first sampling step of sampling at least one of charging or discharging time of a capacitive sensing component of the plurality of capacitive sensing components to determine a first sample time for the component sampled, wherein the component sampled and at least one another component of the plurality of capacitive sensing components are charged or discharged simultaneously during the first sampling step; a first comparing step of comparing the first sample time for the component sampled with a reference time; and an outputting step of outputting a trigger signal in the event that the first sample time exceeds the reference time.

20 Claims, 4 Drawing Sheets

SENSING METHOD AND CIRCUIT FOR USE WITH CAPACITIVE SENSING DEVICES

This application claims the benefit of Chinese Patent Application No. 201110243049.6, filed Aug. 19, 2011 which application is hereby incorporated herein by reference.

TECHNICAL FIELD

This invention relates generally to electronic circuits, and more particularly to a sensing method and circuit for use with capacitive sensing devices.

BACKGROUND

Many touch sensing devices have been used in electrical or electronic apparatuses for receiving data and/or command entries from operators or users of the apparatuses, such as touch sensing screens, touch sensing pads and touch sensing keys. Based on the manner of touch sensing, the touch sensing devices can be divided into capacitive sensing devices, resistive sensing devices and heat sensing devices.

The capacitive sensing device generally detects a capacitance change in a sensing capacitor to determine if it is touched or not. Specifically, the capacitive sensing device generally has a plurality of capacitive sensing components, each of which has a sensor plate and a ground plate acting as two conductive plates. The sensor plate and the ground plate are separately positioned under a dielectric overlay to form the sensing capacitor. The amount of capacitance of the sensing capacitor depends on the magnitude of the electric field coupled between the sensor plate and the ground plate. When the capacitive sensing component is touched by a finger, the sensing capacitor will significantly increase due to human body effect, that is, the electric field coupled between the sensor plate and the ground plate is partially absorbed by the finger.

The capacitive sensing devices are commonly used in kitchen appliances or control panels exposed to all weather conditions. Therefore, these capacitive sensing devices easily come into contact with moisture, water droplets or water films. When the capacitive sensing device is covered with water or other conductive liquid, the capacitance of the sensing capacitor may also increase because the electric field is dissipated to the ground plate via the conductive liquid. Sometimes, for example, when the capacitive sensing device is covered with a pool of water, such increase in the capacitance of the sensing capacitor might become high enough to be falsely detected as a touch. As a result, it is difficult to separate the condition when the device is touched by a finger and the condition when the device is covered with water.

One approach that has been used to avoid the false touch detection employs an additional guard sensor for sensing water. When the capacitive sensing device is covered with water, the guard sensor will generate an enclosing signal and then send the enclosing signal to a control unit of the capacitive sensing device, such as a micro control unit (MCU), which causes the entire capacitive sensing device to be locked. The water-covered region of the capacitive sensing device will not sense any touch until the water is wiped off, nor will other regions not covered with water. Consequently, the locked capacitive sensing device will not generate any false touch detection. However, this approach requires additional printed circuit board (PCB) area and MCU pins for the guard sensor, which increases the manufacturing cost. Moreover, it is inconvenient that the entire capacitive sensing device cannot work normally even if only part of the device is covered with water.

SUMMARY

There is a need for a sensing method and circuit for use with capacitive sensing devices with low cost.

In one embodiment, a sensing method of a capacitive sensing device is disclosed. The capacitive sensing device has a plurality of capacitive sensing components, each of which is charged or discharged by a charging component respectively. The sensing method comprises the steps of: a first sampling step of sampling at least one of charging or discharging time of a capacitive sensing component of the plurality of capacitive sensing components to determine a first sample time for the component sampled, wherein the component sampled and at least one another component of the plurality of capacitive sensing components are charged or discharged simultaneously during the first sampling step; a first comparing step of comparing the first sample time for the component sampled with a reference time; and an outputting step of outputting a trigger signal in the event that the first sample time exceeds the reference time.

In another embodiment, a circuit for use with a capacitive sensing device is disclosed. The capacitive sensing device has a plurality of capacitive sensing components, each of which is charged or discharged by a charging component respectively. The circuit comprises: a sampling module, configured to sample at least one of charging or discharging time of a capacitive sensing component of the plurality of capacitive sensing components; a control module, configured to provide a first control signal to the charging components for charging or discharging the component sampled and at least one another component of the plurality of capacitive sensing component s simultaneously during the first sampling period, and to generate a first sample time for the component sampled according to the at least one of charging or discharging time of the first sampling period; and a comparing module, configured to compare the first sample time with a reference time and to output a trigger signal in the event that the first sample time exceeds the reference time.

The sensing method and circuit according to embodiments of the present invention can easily avoid outputting a trigger signal when the capacitive sensing device is covered with water, and thus the capacitive sensing components will not be locked under this condition. Moreover, the guard sensor used in the conventional circuit can be omitted, which leads to a smaller PCB area and less MCU pin occupation.

The foregoing has outlined, rather broadly, features of the present disclosure. Additional features of the disclosure will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present disclosure and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

Figure 1:
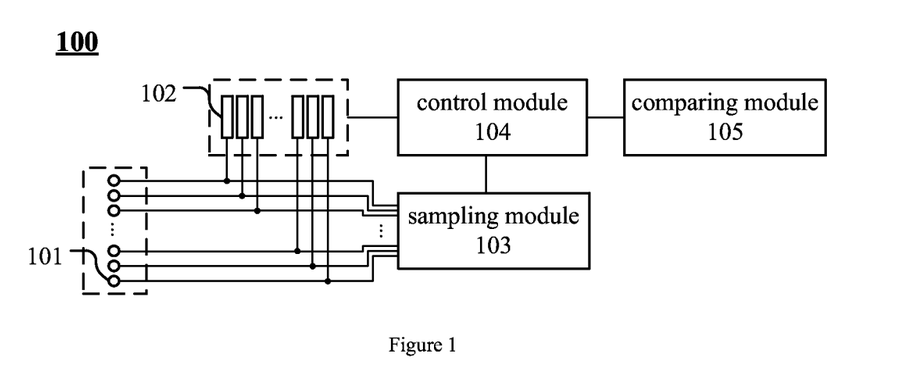
FIG. 1 illustrates a circuit 100 for use with a capacitive sensing device according to an embodiment of the present invention.

FIG. 1 illustrates a circuit 100 for use with a capacitive sensing device according to an embodiment of the present invention. The capacitive sensing device has a plurality of capacitive sensing components 101, each of which is charged or discharged by a charging component 102 respectively. The charging component 102 may be a current source, and the charging and/or discharging by the charging component 102 is controlled by control signals. In an embodiment, the plurality of capacitive sensing components 101 may be a capacitive sensing pad with multiple capacitive sensing pixels, a capacitive sensing screen with multiple capacitive sensing pixels, or a plurality of capacitive sensing keys of, for example, kitchen appliances such as IH-cookers or control panels, serving as input devices for receiving entries. In an embodiment, the circuit 100 can be included in the capacitive sensing device.

In an embodiment, the circuit 100 comprises a sampling module 103, a control module 104 and a comparing module 105.

The sampling module 103 is configured to sample at least one of charging or discharging time of one capacitive sensing component of the plurality of capacitive sensing components 101. Specifically, the sampling module 103 may have a plurality of detection channels, each of which has a voltage detector configured to detect the voltage of the capacitive sensing component 101, i.e., the voltage on a sensing capacitor coupled by the capacitive sensing component 101. In an embodiment, each of the plurality of capacitive sensing components 101 may have a sensor plate and a ground plate acting as two conductive plates. The sensor plate and the ground plate can be separately positioned under a dielectric overlay to form the sensing capacitor. The amount of capacitance of the sensing capacitor depends on the magnitude of the electric field coupled between the sensor plate and the ground plate. Preferably, the charging component 102 may charge and discharge the sensing capacitor periodically or repeatedly under the control of the control signals. Therefore, the sampling module 103 may sample one charging time and/or one discharging time during each charging and discharging period, i.e., each sampling period.

Figure 2:
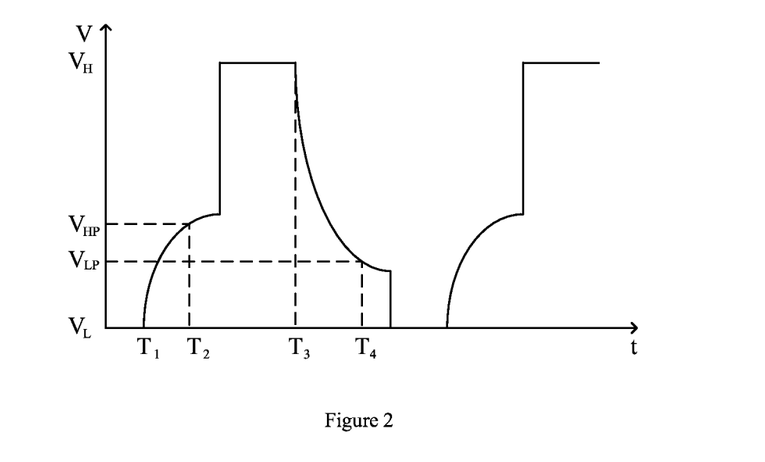
FIG. 2 illustrates evolution of the voltage of the capacitive sensing component sampled along time according to the embodiment of FIG. 1.

When the capacitive sensing component 101 is charged or discharged by the charging component 102, the voltage of the capacitive sensing component 101 will change over time accordingly. FIG. 2 illustrates evolution of the voltage of the capacitive sensing component sampled along time according to the embodiment of FIG. 1.

As shown in FIG. 2, the capacitive sensing component 101 is charged and discharged periodically. During each charging and discharging period, the voltage of the capacitive sensing component 101 increases from a low voltage potential $V_L$, such as ground, to a high voltage potential $V_H$. Afterwards, the voltage of the capacitive sensing component holds at the high voltage potential $V_H$ for an interval and then decreases to the low voltage potential $V_L$ due to discharging.

Therefore, in order to determine the charging time and/or the discharging time of the capacitive sensing component 101, the voltage detector of the sampling module 103 will measure change in the voltage of the sensing capacitor accordingly. In the embodiment, the sampling module 103 may take a first time difference between a first point $T_1$ when the sensing capacitor is initially charged, for example, when the voltage of the sensing capacitor is around the low voltage potential $V_L$, and a second point $T_2$ when the sensing capacitor is charged to a predetermined high voltage potential $V_{HP}$, as the charging time of the capacitive sensing component 101. Furthermore, the sampling module 103 may also take a second time difference between a third point $T_3$ when the sensing capacitor is initially discharged, for example, when the voltage of sensing capacitor is around the high voltage potential $V_H$, and a fourth point $T_4$ when the sensing capacitor is discharged to a predetermined low voltage potential $V_{LP}$, as the discharging time of the capacitive sensing component 101. Moreover, the sampling module 103 is further configured to provide the charging and/or discharging time to the control module 104.

The control module 104 is configured to provide a first control signal to the charging components 102 for charging or discharging the capacitive sensing component sampled and at least one other component of the plurality of capacitive sensing components 101 simultaneously during a first sampling period. As described above, upon receiving the first control signal, the capacitive sensing component sampled and the at least one other component will be charged and/or discharged by the charging components 102 respectively. In an embodiment, the at least one other component of the plurality of capacitive sensing components 101 may comprise a component of the plurality of capacitive sensing components 101 adjacent to the capacitive sensing component sampled. In another embodiment, the at least one other component of the plurality of capacitive sensing components 101 may comprise all of the plurality of capacitive sensing components 101.

The control module 104 is further configured to generate a first sample time according to the at least one of charging or discharging time of the first sampling period, which is provided by the sampling module 103. In an embodiment, the control module 104 may calculate at least one of a sum value or a mean value of the charging or discharging time of the capacitive sensing component sampled as the first sample time, or take one of the charging time or discharging time as the first sample time. Moreover, the control module 104 is configured to provide the first sample time to the comparing module 105 for a further comparison.

The comparing module 105 is configured to compare the first sample time for the capacitive sensing component sampled with a reference time to determine if the first sample time exceeds the reference time, and to output a trigger signal in the event that the first sample time exceeds the reference time.

Specifically, as the first sample time for the capacitive sensing component sampled is based on the charging and/or discharging time of the sensing capacitor, the reference time to which the first sample time is compared can be used to determine the relative magnitude of the capacitance of the sensing capacitor. That is, if the first sample time for the capacitive sensing component sampled is bigger than the reference time, it indicates that the capacitance of the sensing capacitor coupled by the capacitive sensing component sampled is bigger than a predefined capacitance. Therefore, the comparing module 105 will generate and output the trigger signal, which indicates that the capacitive sensing component sampled is touched. The trigger signal can be identified as a real touch. If the first sample time for the capacitive sensing component sampled is smaller than the reference time, it indicates that the sensing capacitor is smaller than the predefined capacitance, i.e., the capacitive sensing component sampled is not touched by a finger.

Figure 3:
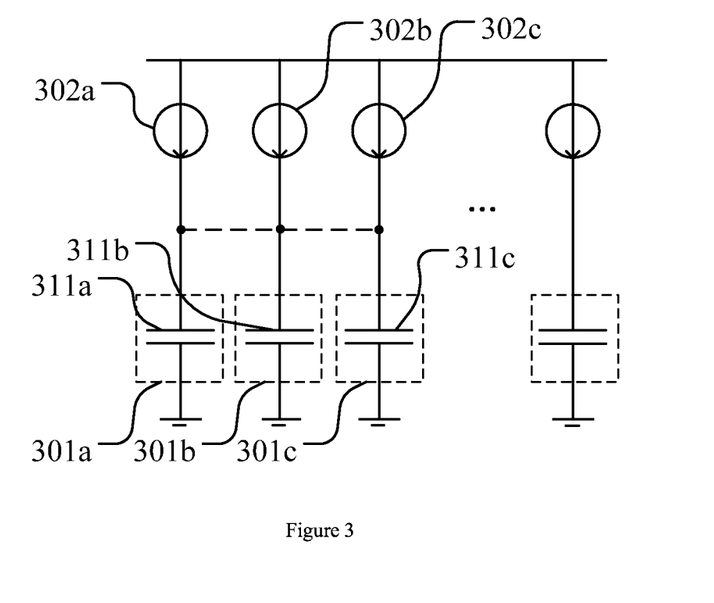
FIG. 3 illustrates a simplified diagram of the capacitive sensing device covered with water according to an embodiment of the present invention.
Figure 4:
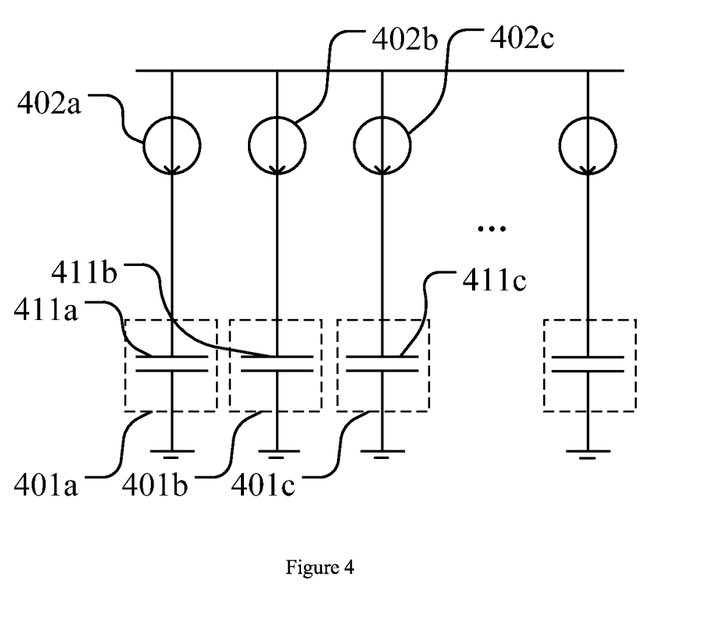
FIG. 4 illustrates a simplified diagram of the capacitive sensing device touched by a finger according to an embodiment of the present invention.

FIG. 3 illustrates a simplified diagram of the capacitive sensing device covered with water according to an embodiment of the present invention. FIG. 4 illustrates a simplified diagram of the capacitive sensing device touched by a finger according to an embodiment of the present invention. Hereinafter, the working of the capacitive sensing device and the circuit 100 of FIG. 1 will be elaborated with reference to FIGS. 3 and 4.

As shown in FIG. 3, when the capacitive sensing device is covered with a pool of water or other conductive liquid, the conductive liquid may cover some capacitive sensing components of the capacitive sensing device, for example, capacitive sensing components 301a-301c in FIG. 3. Then, the conductive liquid may cause the capacitances of the sensing capacitors 311a-311c to increase, wherein the sensing capacitors 311a-311c are the sensing capacitors for the capacitive sensing components 301a-301c. However, the corresponding charging components 302a-302c for the capacitive sensing components 301a-301c may be electrically coupled in parallel due to the conductive liquid, which leads to a significantly bigger charging current or charging electric field for charging the sensing capacitors 311a-311c. Therefore, when the capacitive sensing component 301a is sampled, the increased charging current or charging electric field provided by the coupled charging components 302a-302c can compensate for the increased capacitance of the sensing capacitors 311a accordingly, which leads to a relatively short charging or discharging time compared with those sampled by conventional circuits.

As shown in FIG. 4, when a capacitive sensing component 401 a is touched by a finger, the capacitance of a sensing capacitor 411a for the capacitive sensing component 401a may increase. However, the touch at the capacitive sensing component 401a can not couple any of the charging components of the capacitive sensing device together in parallel. Thus, the sensing capacitors 411a with an increased capacitance can only be charged or discharged by the corresponding charging component 402a. As a result, when the capacitive sensing component 401a is sampled, the charging or discharging time of the sensing capacitor 411a will significantly increase, and therefore the difference between the first sample times can be identified by comparing with the reference time. Specifically, the first sample time when the device is touched is longer than the reference time, which may be long enough to be detected as a touch. However, the first sample time when the device is covered with water is shorter than the reference time, which may not be long enough to be detected as a touch.

As can be seen from the previous descriptions, the circuit 100 can easily avoid outputting a trigger signal when the capacitive sensing device is covered with water, and thus the circuit 100 does not have to lock all of the capacitive sensing components under this condition. Moreover, the guard sensor used in the conventional circuit can be omitted, which leads to a smaller PCB area and less MCU pin occupation.

Still referring to FIG. 1, in some practical applications, it is also desired to identify the condition when the capacitive sensing device is covered with water, in order to indicate to the operator of the device the need for a further operation, such as wiping off the water. Thus, preferably, the circuit 100 may sample a capacitive sensing component twice in two sampling periods, and make comparisons twice. One of the sampling and comparisons is used to identify if a sensing capacitor over a predefined capacitance is sensed, and the other is used to separate the condition when the capacitive sensing component sampled is covered with water and the condition when the capacitive sensing component sampled is touched by a finger.

Thus, in the preferred embodiment, the control module 104 is further configured to provide a second control signal to the charging components 102 for only charging or discharging the capacitive sensing component sampled during a second sampling period. Then, the control module 104 can generate a second sample time according to at least one of the charging or discharging time of the second sampling period. Because only the capacitive sensing component sampled is charged or discharged during the second sampling period, the second sample time may increase when the capacitive sensing component is covered with water as well as when it is touched by a finger.

Moreover, in the embodiment, the comparing module 105 is further configured to compare the second sample time for the capacitive sensing component sampled with the reference time, and to output a warning signal in the event that the first sample time does not exceed the reference time and the second sample time exceeds the reference time. In an embodiment, the warning signal may indicate that the capacitive sensing component sampled is covered with water or other conductive liquid, which can be used to remind the user of a further operation.

Figure 5:
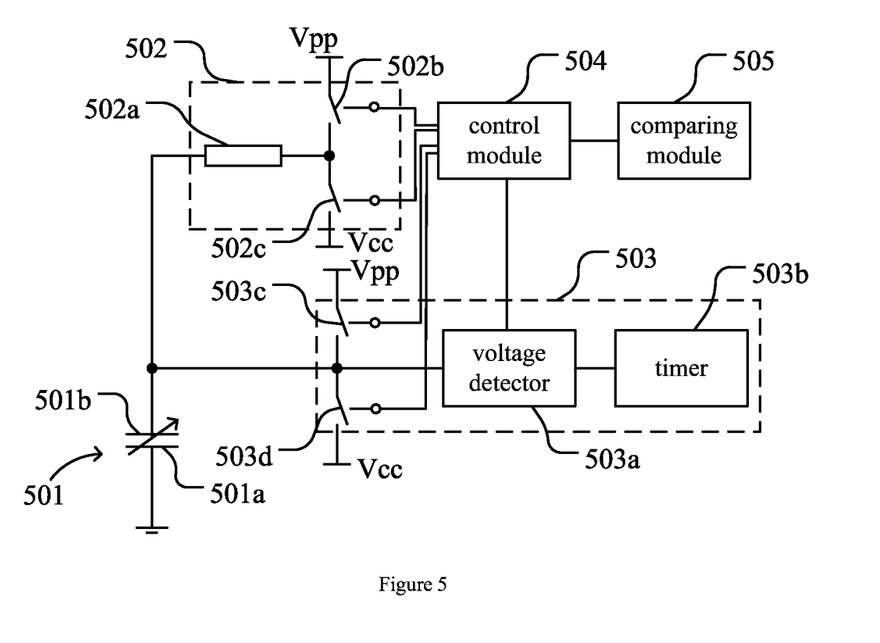
FIG. 5 illustrates an example of detailed architecture of the capacitive sensing device and the circuit according to an embodiment of the present invention.

FIG. 5 illustrates an example of detailed architecture of the capacitive sensing device and the circuit according to an embodiment of the present invention.

In FIG. 5, the capacitive sensing device comprises a plurality of capacitive sensing components 501 (only one capacitive sensing component is shown), each of which is charged or discharged by a charging component 502. Each of the capacitive sensing components 501 has a ground plate 501a and a sensor plate 501b being separately positioned under a dielectric overlay (not shown) that act as a variable sensing capacitor, wherein the ground plate 501a is grounded and the sensor plate 501b is coupled to the charging component 502. In an embodiment, the capacitance of the sensing capacitor for the capacitive sensing component 501 depends on the magnitude of the electric field coupled between the sensor plate 501b and the ground plate 501a.

The charging component 502 comprises a resistor 502a, a first switch 502b and a second switch 502c, and the first and second switches are coupled in series. A first node of the resistor 502a is coupled to the capacitive sensing component 501 for providing a charging current or discharging current, and a second node of the resistor 502a is coupled to a common node of the series-coupled switches 502b, 502c. The other node of the first switch 502b is coupled to a positive power supply $V_{pp}$, and the other node of the second switch 502c is coupled to a negative power supply $V_{cc}$ or ground. The control nodes of the switches 502b and 502c are coupled to the control module 504.

In operation, the control module 504 may provide a control signal to switch on the first switch 502b and switch off the second switch 502c to generate a charging current to the capacitive sensing component 501. The control module 504 may also provide a control signal to switch off the first switch 502b and switch on the second switch 502c to generate a discharging current to the capacitive sensing component 501. The control module 504 may also provide a control signal to switch off the first and second switch 502b and 502c to stop charging or discharging the capacitive sensing component 501. Based on such control signals, any of the plurality of the charging components 501 can be simultaneously selected.

The positive power supply $V_{pp}$ is generally generated from an alternating current by AC-DC transformation. Thus, the positive power supply $V_{pp}$ may comprise an AC component, for example, a 50 Hz power frequency noise, and the AC component may be introduced into the charging or discharging current via the charging component 502. The AC component will adversely influence the sampling of charging or discharging time of the capacitive sensing component 501. In a preferred embodiment, the sampling module 503 is configured to sample the charging or discharging time when a magnitude of the AC component of the positive power supply $V_{pp}$ is around zero. Under this condition, the influence can be significantly reduced and the charging and/or discharging time can be precisely determined.

The sampling module 503 comprises a voltage detector 503a and a timer 503b, wherein the voltage detector 503a is coupled to the capacitive sensing component 501 to measure the voltage of the sensing capacitor, and the timer 503b is configured to count the charging and discharging time based on the measurement of the voltage detector 503a. Moreover, the input of the voltage detector 503a is coupled between a third switch 503c and a fourth switch 503d, which are controlled under the control signals provided by the control module 504. In operation, the control module 504 may provide a control signal to switch off both of the third and fourth switches, which causes the sampling component 503 to sample the charging time or discharging time of the capacitive sensing component 501. It is appreciated that the sampling module 503 may use an external timer instead of the internal timer 503b.

As a result, different charging components 502 and detection channels within the sampling module 503 can be selected by providing corresponding control signals thereto, and therefore, the capacitance of the sensing capacitor coupled by the capacitive sensing components 501 can be determined.

Figure 6:
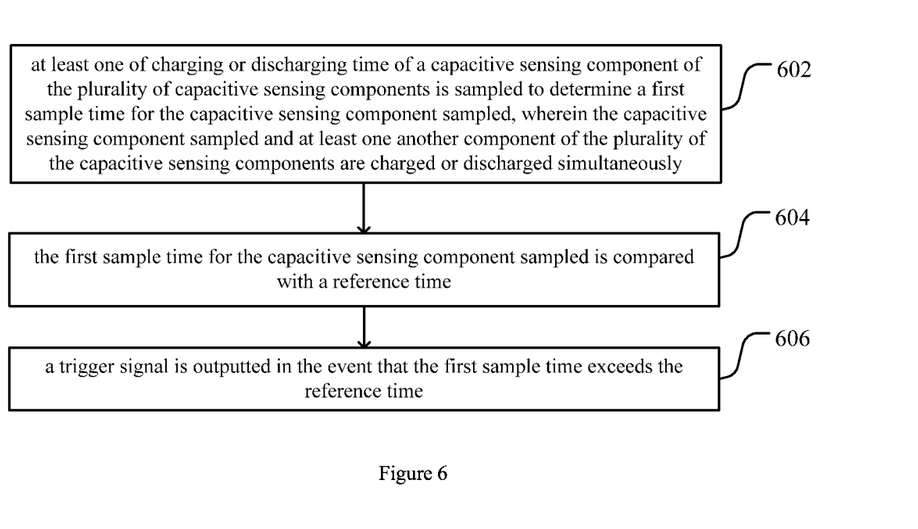
FIG. 6 illustrates a flow chart of a sensing method of a capacitive sensing device according to another embodiment of the present invention.

FIG. 6 illustrates a flow chart of a sensing method of a capacitive sensing device according to another embodiment of the present invention. The capacitive sensing device has a plurality of capacitive sensing components, each of which is charged or discharged by a charging component respectively.

As shown in FIG. 6, in a first sampling step 602, at least one of charging or discharging time of a capacitive sensing component of the plurality of capacitive sensing components is sampled to determine a first sample time for the capacitive sensing component sampled. The capacitive sensing component sampled and at least one other component of the plurality of the capacitive sensing components are charged or discharged simultaneously during the first sampling step 602. In an embodiment, each of the capacitive sensing components has a ground plate and a sensor plate being separately positioned under a dielectric overlay that act as a variable sensing capacitor, wherein the ground plate is grounded and the sensor plate is coupled to the charging component. Preferably, the capacitance of the sensing capacitor for the capacitive sensing component depends on the magnitude of the electric field coupled between the sensor plate and the ground plate.

In an embodiment, the charging component comprises a resistor, a first switch and a second switch, and the first and second switches are coupled in series. A first node of the resistor is coupled to the capacitive sensing component for providing a charging current thereto, and a second node of the resistor is coupled to a common node of the series-coupled switches. The other node of the first switch is coupled to a positive power supply, and the other node of the second switch is coupled to a negative power supply or ground. Preferably, the first sampling step 602 is performed when a magnitude of AC component of a power source for supplying the charging components is around zero.

In an embodiment, the at least one other component of the plurality of capacitive sensing components comprise a component of the plurality of capacitive sensing components adjacent to the capacitive sensing component sampled.

In an embodiment, the first sampling step 602 further comprises calculating at least one of a sum value or a mean value of the charging or discharging time of the component sampled as the first sample time for the component sampled.

Still referring to FIG. 6, in a first comparing step 604, the first sample time for the capacitive sensing component sampled is compared with a reference time to determine if the first sample time exceeds the reference time.

In an outputting step 606, a trigger signal is outputted in the event that the first sample time exceeds the reference time.

As described above, the sensing method can easily prevent the capacitive sensing device from outputting a trigger signal when it is covered with water, and thus the capacitive sensing device does not have to lock all of the capacitive sensing components under this condition. Moreover, the guard sensor used in the conventional circuit can be omitted, which leads to a smaller PCB area and less MCU pins occupation.

Figure 7:
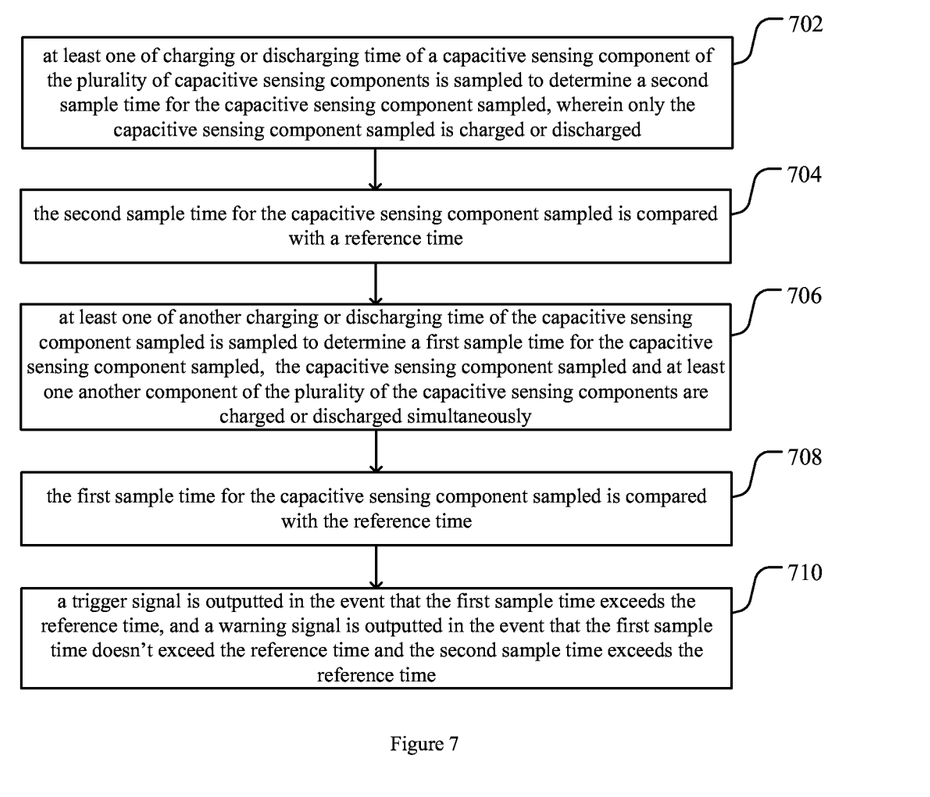
FIG. 7 shows a flow chart of a sensing method of a capacitive sensing device according to a further embodiment of the present invention.

FIG. 7 shows a flow chart of a sensing method of a capacitive sensing device according to a further embodiment of the present invention. The capacitive sensing device has a plurality of capacitive sensing components, each of which is charged or discharged by a charging component respectively.

As shown in FIG. 7, in a second sampling step 702, at least one of a charging or discharging time of a capacitive sensing component of the plurality of capacitive sensing components is sampled to determine a second sample time for the capacitive sensing component sampled, wherein only the capacitive sensing component sampled is charged or discharged during the second sampling step 702.

In a second comparing step 704, the second sample time for the capacitive sensing component sampled is compared with a reference time to determine if the second sample time exceeds the reference time.

Afterwards, in a first sampling step 706, at least one of another charging or discharging time of the capacitive sensing component sampled in the step 702 is sampled to determine a first sample time for the capacitive sensing component sampled. The capacitive sensing component sampled and at least one other component of the plurality of the capacitive sensing components are charged or discharged simultaneously during the first sampling step 706.

In a first comparing step 708, the first sample time for the capacitive sensing component sampled is compared with the reference time to determine if the first sample time exceeds the reference time.

In an outputting step 710, a trigger signal can be outputted in the event that the first sample time exceeds the reference time, and a warning signal can be outputted in the event that the first sample time does not exceed the reference time and the second sample time exceeds the reference time.

As described above, by sampling a capacitive sensing component and making comparisons twice, the sensing method can further identify the condition when the capacitive sensing component sampled is covered with water and the condition when the capacitive sensing component sampled is touched by a finger.

In the disclosure herein, operations of circuit embodiment(s) may be described with reference to method embodiment(s) for illustrative purposes. However, it should be appreciated that the operations of the circuits and the implementations of the methods in the disclosure may be independent of one another. That is, the disclosed circuit embodiments may operate according to other methods and the disclosed method embodiments may be implemented through other circuits.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacturing, compositions of matter, means, methods, or steps.

What is claimed is:

1. A sensing method of a capacitive sensing device, wherein the capacitive sensing device has a plurality of capacitive sensing components, each of which is charged or discharged by a charging component respectively, the sensing method comprising the steps of:
    a first sampling step of sampling at least one of charging or discharging time of a first capacitive sensing component of the plurality of capacitive sensing components to determine a first sample time for the first component, wherein
        the first component and at least one other component of the plurality of capacitive sensing components are charged or discharged simultaneously by the charging component of the first component and the charging component of the at least one other component, respectively, during the first sampling step, and
        when liquid is present on the capacitive sensing device at the first component and the at least one other component, the first component of the plurality of capacitive sensing components is charged or discharged by both the charging component of the first component and the charging component of the at least one other component during the first sampling step;
    comparing the first sample time for the first component with a reference time; and
    outputting a trigger signal in the event that the first sample time exceeds the reference time;
    wherein the plurality of capacitive sensing components comprises a capacitive sensing pad, a capacitive sensing screen or a plurality of capacitive sensing keys.

2. The sensing method as claimed in claim 1, wherein the at least one other component of the plurality of capacitive sensing components comprises a component of the plurality of capacitive sensing components adjacent to the first component.

3. The sensing method as claimed in claim 1, wherein each of the capacitive sensing components has a ground plate and a sensor plate being separately positioned under a dielectric layer.

4. The sensing method as claimed in claim 1, wherein the first sampling step further comprises calculating at least one of a sum value or a mean value of the charging or discharging time of the first component as the first sample time.

5. The sensing method as claimed in claim 1, wherein the capacitive sensing pad comprises a plurality of capacitive sensing pixels and the capacitive sensing screen comprises a plurality of sensing pixels.

6. A sensing method of a capacitive sensing device, wherein the capacitive sensing device has a plurality of capacitive sensing components, each of which is charged or discharged by a charging component respectively, the sensing method comprising the steps of:
    a first sampling step of sampling at least one of charging or discharging time of a first capacitive sensing component of the plurality of capacitive sensing components to determine a first sample time for the first component, wherein the first component and at least one other component of the plurality of capacitive sensing components are charged or discharged simultaneously during the first sampling step;
    comparing the first sample time for the first component with a reference time;
    outputting a trigger signal in the event that the first sample time exceeds the reference time;
    a second sampling step of sampling at least one of another charging and discharging time of the first component to determine a second sample time for the first component, wherein only the first component is charged or discharged during the second sampling step; and
    a second comparing step of comparing the second sample time for the first component with the reference time;
    wherein the outputting step further comprises outputting a warning signal in the event that the first sample time does not exceed the reference time and the second sample time exceeds the reference time.

7. The sensing method as claimed in claim 6, wherein the second sampling and second comparing steps are performed before the first sampling and first comparing steps.

8. A circuit for use with a capacitive sensing device, wherein the capacitive sensing device has a plurality of capacitive sensing components, each of which is configured to be charged or discharged by a charging component respectively, the circuit comprising:
- a sampling module, configured to sample at least one of charging or discharging time of a first capacitive sensing component of the plurality of capacitive sensing components;
- a control module, configured to
  - provide a first control signal to the charging components for charging or discharging the first component and at least one other component of the plurality of capacitive sensing components simultaneously using the charging component of the first component and the charging component of the at least one other component, respectively, during a first sampling period, wherein, when liquid is present on the capacitive sensing device at the first component and the at least one other component, the first component of the plurality of capacitive sensing components is charged or discharged using both the charging component of the first component and the charging component of the at least one other component during the first sampling step, and
  - generate a first sample time for the first component according to the at least one of charging or discharging time of the first sampling period; and
- a comparing module, configured to compare the first sample time with a reference time and to output a trigger signal in the event that the first sample time exceeds the reference time;
- wherein the plurality of capacitive sensing components comprises a capacitive sensing pad, a capacitive sensing screen or a plurality of capacitive sensing keys.

9. The circuit as claimed in claim 8, wherein the at least one other component of the plurality of capacitive sensing components comprises a component of the plurality of capacitive sensing components adjacent to the component sampled.

10. The circuit as claimed in claim 8, wherein each of the capacitive sensing components has a ground plate and a sensor plate being separately positioned under a dielectric layer.

11. The circuit as claimed in claim 8, wherein the control module is further configured to calculate at least one of a sum value or a mean value of the charging or discharging time of the first component as the first sample time for the first component.

12. The circuit as claimed in claim 8, wherein the capacitive sensing pad comprises a plurality of capacitive sensing pixels and the capacitive sensing screen comprises a plurality of sensing pixels.

13. A circuit for use with a capacitive sensing device, wherein the capacitive sensing device has a plurality of capacitive sensing components, each of which is configured to be charged or discharged by a charging component respectively, the circuit comprising:
- a sampling module, configured to sample at least one of charging or discharging time of a first capacitive sensing component of the plurality of capacitive sensing components;
- a control module, configured to provide a first control signal to the charging components for charging or discharging the first component and at least one other component of the plurality of capacitive sensing components simultaneously during a first sampling period, and to generate a first sample time for the first component according to the at least one of charging or discharging time of the first sampling period, wherein the control module is further configured to provide a second control signal to the charging components for charging or discharging the first component during a second sampling period, and to generate a second sample time for the first component according to at least one of another charging or discharging time of the second sampling period; and
- a comparing module, configured to compare the first sample time with a reference time and to output a trigger signal in the event that the first sample time exceeds the reference time, wherein the comparing module is further configured to compare the second sample time for the first component sampled with the reference time, and to output a warning signal in the event that the first sample time does not exceed the reference time and the second sample time exceeds the reference time.

14. A device, comprising:
- an input device including a plurality of capacitive sensing components and a plurality of charging components for charging or discharging the plurality of capacitive sensing components, wherein the input device comprises a capacitive sensing pad, a capacitive sensing screen or a plurality of capacitive sensing keys;
- a control module, configured to
  - provide a first control signal to the plurality of charging components, the first control signal causing at least one of (1) simultaneously charging a first capacitive sensing component and at least one other component of the plurality of capacitive sensing components during a first sampling period, and (2) simultaneously discharging the first capacitive sensing component and at least one other component of the plurality of capacitive sensing components during a first sampling period, and
  - provide a second control signal to the plurality of charging components, the second control signal causing at least one of (1) charging the first capacitive sensing component without charging another one of the plurality of capacitive sensing components during a second sampling period, and (2) discharging the first capacitive sensing component without discharging another one of the plurality of capacitive sensing components during a second sampling period;
- a sampling module, configured to sample a response time of a first capacitive sensing component of the plurality of capacitive sensing components and to generate a first sample time; and
- a comparing module, configured to compare the first sample time with a reference time and to output a trigger signal in the event that the first sample time exceeds the reference time.

15. The device as claimed in claim 14, wherein the response time is the time for the first capacitive sensing component to charge to a predetermined high voltage level.

16. The device as claimed in claim 14, wherein the response time is the time for the first capacitive sensing component to discharge to a predetermined low voltage level.

17. The device of claim 14, wherein the sampling module comprises a voltage detector and a timer.

18. The device of claim 14, wherein the capacitive sensing pad comprises a plurality of capacitive sensing pixels and the capacitive sensing screen comprises a plurality of sensing pixels.

19. A device, comprising:
an input device including a plurality of capacitive sensing components and a plurality of charging components for charging or discharging the plurality of capacitive sensing components, wherein each respective charging component includes:
- a first switch connected between a first power supply node and a common node;
- a second switch connected between a second power supply node and the common node; and
- a resistive element connected between the common node and a respective one of the plurality of capacitive sensing components;

a control module, configured to provide a first control signal to the plurality of charging components, the first control signal causing at least one of (1) simultaneously charging a first capacitive sensing component and at least one other component of the plurality of capacitive sensing components during a first sampling period, and (2) simultaneously discharging the first capacitive sensing component and at least one other component of the plurality of capacitive sensing components during a first sampling period;

a sampling module, configured to sample a response time of a first capacitive sensing component of the plurality of capacitive sensing components and to generate a first sample time; and a comparing module, configured to compare the first sample time with a reference time and to output a trigger signal in the event that the first sample time exceeds the reference time.

20. The device of claim 19, wherein the control module is configured to generate first and second switch control signals to control the first and second switch, respectively.

\* \* \* \* \*